United States Patent [19]

Deschamps et al.

[11] Patent Number: 5,393,026

[45] Date of Patent: Feb. 28, 1995

[54] ELECTRICAL FIXTURE HANGER

[75] Inventors: Bernard F. Deschamps; Henry J. Macuga, both of Ware, Mass.; Stuart S. Cox, Tallahassee, Fla.

[73] Assignee: Eclipse Manufacturing Inc., Ware, Mass.

[21] Appl. No.: 126,856

[22] Filed: Sep. 27, 1993

Related U.S. Application Data

[63] Continuation-in-part of Ser. No. 889,921, Jun. 2, 1992, Pat. No. 5,303,894.

[51] Int. Cl.⁶ .............................................. B42F 13/00
[52] U.S. Cl. ...................................... 248/343; 248/57
[58] Field of Search ................ 248/343, 342, 344, 57, 248/506, 906

[56] References Cited

U.S. PATENT DOCUMENTS

| | | | |
|---|---|---|---|
| 929,097 | 7/1909 | Lutz et al. | |
| 2,140,861 | 12/1938 | Steketee | 247/22 |
| 2,809,002 | 10/1957 | Rudolph | 248/205 |
| 2,906,488 | 9/1959 | Wolar | 248/343 X |
| 4,023,697 | 5/1977 | Marrero | 220/3.4 |
| 4,050,603 | 9/1977 | Harris et al. | 220/3.9 |
| 4,295,575 | 10/1981 | Flachbarth | 220/3.92 |
| 4,518,141 | 5/1985 | Parkin | 248/546 |
| 4,909,405 | 3/1990 | Kerr, Jr. | 220/3.9 |
| 4,954,032 | 9/1990 | Morales | 411/289 |
| 5,118,237 | 6/1992 | Wright | 411/433 |
| 5,150,868 | 9/1992 | Kaden | 248/343 |
| 5,303,894 | 4/1994 | Deschamps et al. | 248/343 |

FOREIGN PATENT DOCUMENTS 1475335 3/1967 France.

*Primary Examiner*—Ramon O. Ramirez
*Attorney, Agent, or Firm*—Popham, Haik, Schnobrich & Kaufman, Ltd.

[57] ABSTRACT

An extensible hanger support providing a spanning connection between two spaced-apart joists or the like for supporting therefrom such items as ceilings fans, lights fixtures and the like. The support includes first and second extensible members which are telescopically axially movable between a fully collapsed condition and a fully extended condition. These extensible members employ cooperative means which are normally in threaded engagement in such a manner that high speed rotation of one of the members relative to the other results in axial movement toward either the fully collapsed condition or the fully extended condition depending upon the direction of rotation. Each of these extensible members has a free end which carries joist engaging means for respectively engaging a ceiling joist.

6 Claims, 4 Drawing Sheets

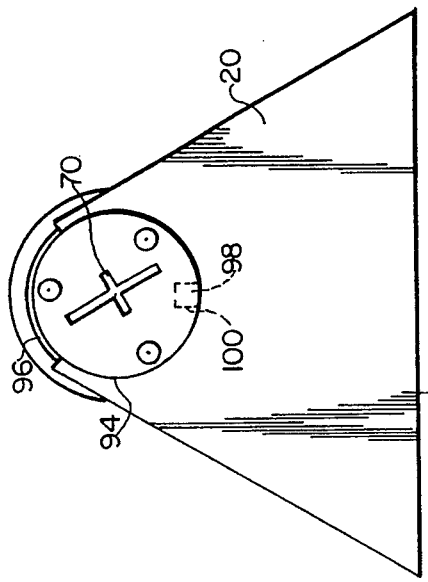
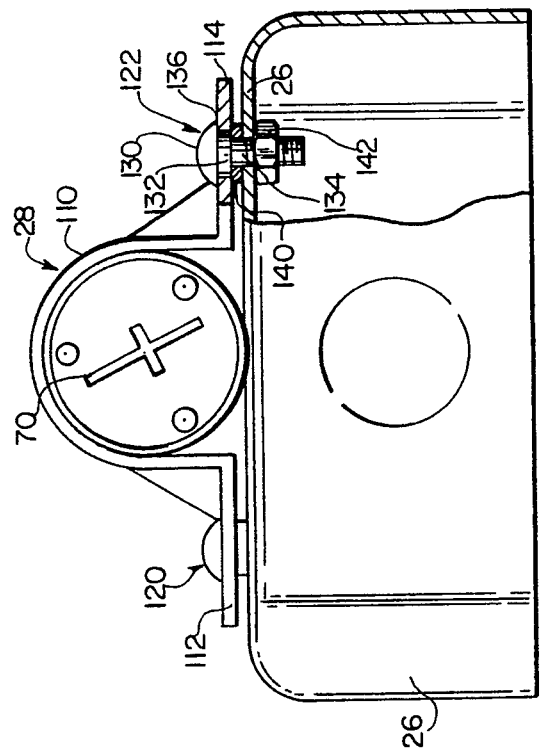
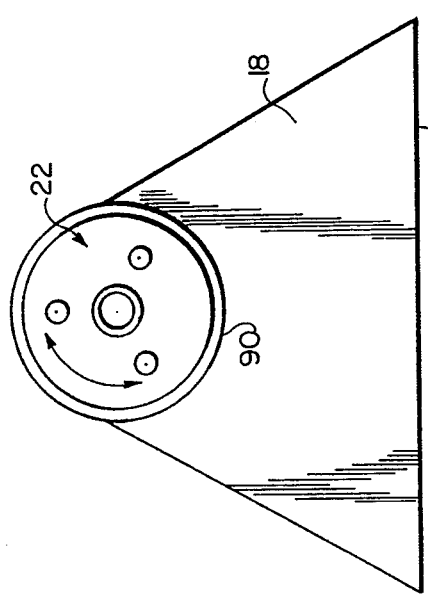
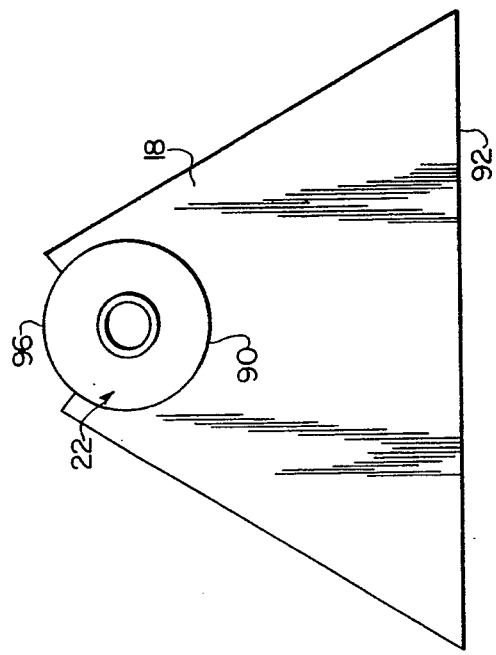
FIG. 4
FIG. 6
FIG. 3
FIG. 5

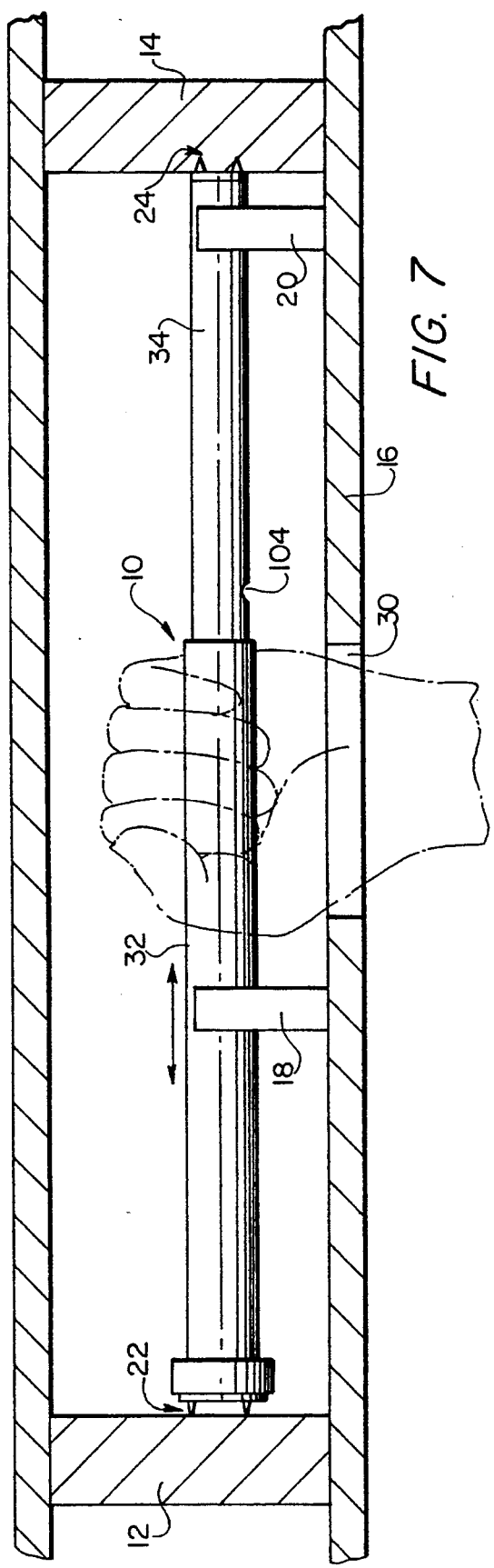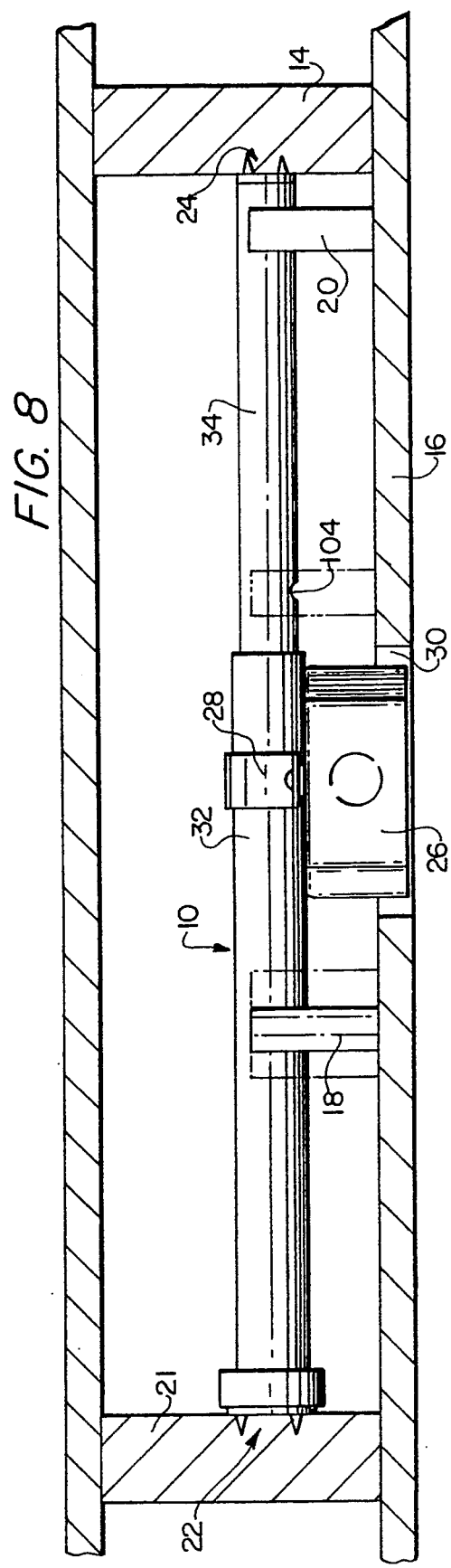

ELECTRICAL FIXTURE HANGER

This is a continuation-in-part application of U.S. Pat. No. 07/889,921, filed Jun. 2, 1992, now U.S. Pat. No. 5,303,894, the entire contents of which are hereby incorporated by reference.

BACKGROUND OF THE INVENTION

1. Field of the Invention

The present invention relates to the art of hanger supports for suspending heavy objects such as ceiling fans, light fixtures and the like from a support extending between a pair of spaced ceiling joists and the like.

2. Related Art

Interjoist hanger supports are well known in the art for supporting the weight of a fan or lighting fixture and the like between a pair of ceiling joists. Frequently, such supports are installed above a ceiling and between floors of a multi-story structure. In such situations, a standard electrical outlet box cannot be directly mounted to a ceiling and support a significant load, such as that presented by a ceiling fan which may have a weight on the order of 10 pounds to 65 pounds. Instead, an interjoist hanger support is mounted between the floors of a multi-story structure and extends transversely between a pair of ceiling joists above a hole placed in the ceiling. Thereafter, an electrical outlet box may be suspended from the support and which, in turn, will support the fan or other relatively heavy fixture, such as a light fixture and the like.

Examples of prior art interjoist hanger supports include those described in U.S. Pat. Nos. 4,463,923 to Reiker, 4,909,405 to Kerr, Jr., and 5,150,868 to Kaden.

The hanger support disclosed in the Reiker patent includes two telescopically extensible members which are in threaded engagement with each other so that the members are movable between a fully collapsed condition and a fully extended condition by hand rotating the members relative to each other. The free ends of the telescopically extensible members carry prongs which are driven into opposing surfaces of a pair of ceiling joists and are held in place by exerted jack screw forces as the members are extended toward their fully extended length. Reiker also provides spacers fixed to the free ends of the extensive members which engage the upper surface of a ceiling so that the hanger support extends parallel to the ceiling and is spaced therefrom by a fixed distance, on the order of two inches.

One problem presented by Reiker's interjoist hanger support is the amount of time required for installation. Typically, such an interjoist hanger support is supplied by the manufacturer in its collapsed condition in which the support has an overall length on the order of fourteen inches. If the ceiling joists are spaced by a distance on the order of twenty-four inches, then the hanger support must be extended substantially before it can be installed in place between a pair of ceiling joists. Because of the threaded connection between the two telescopically extensible members, a substantial amount of time is required by an installer to manually extend the members prior to positioning the spacer so that the support extends transversely between a pair of spaced apart ceiling joists and then further extend the members by rotational forces to cause the joist-engaging prongs or the like on the free ends of the extensible members to be driven into the spaced apart ceiling joists.

Another problem in using an interjoist hanger support such as disclosed in the Reiker patent is that when the extensible members are in their fully extended condition, there is a tendency for the center part of the support to sag somewhat toward the upper surface of the ceiling. This results in a tendency for the joist-engaging prongs or the like mounted on the free ends of the extensible members to become loose and to disengage from the ceiling joists. The spacers extending from the free ends of the hanger support in the Reiker patent are not adjustable in an axial direction to distribute some of the load to a portion of the ceiling closer to the center of the spacer which would relieve the tendency for the spacer to sag and for the end prongs to disengage from the ceiling joists.

The Kerr patent employs a pair of telescopically extensible members which are axially slidable relative to each other and are not in threaded engagement. Thus, while the two members may be rapidly displaced in an axial direction from a collapsed condition to a fully extended condition, there is no threaded engagement between the members to achieve the jack screw forces provided by the hanger support disclosed in the Reiker patent. Moreover, when the device disclosed in the Kerr patent is in its fully extended position, it will have a tendency to sag somewhat because, like that in the Reiker patent, the device disclosed in the Kerr patent employs spacers that are mounted to the free ends of the extensible members and the spacers are not axially movable so that the load may be shifted somewhat toward the center portion of the hanger support.

Another problem in employing an interjoist hanger support such as that disclosed in the Kerr patent relates to the difficulty in mounting an electrical outlet box so as to be suspended from the hanger support. This is particularly difficult when attempted with one hand extended up through an opening in a ceiling. Thus, when employing a device as described in the Kerr patent, the hanger support is interconnected between a pair of spaced apart ceiling joists above an opening in the ceiling. Then with one hand an electrical outlet box is attached to the mid portion of the hanger support. This is accomplished by attaching a saddle bracket over the hanger support with the saddle bracket having a pair of outwardly extending flanges having mounting apertures therein. An electrical junction box is then mounted to the flanges with screws and nuts. This presents substantial difficulty, as the screws, which are mounted in the apertures in the saddle flanges, tend to become dislodged while attempting to secure the outlet box in place by means of nuts to be threaded onto the threaded portion of the screws.

The Kaden patent shows a hanger support employing a pair of telescopically extensible members carrying joist-engaging means, buttress threaded cooperative means including quick release means for releasing the extensible members from threaded engagement, and spacers carried by the extensible members for supporting the hanger support above the upper surface of a ceiling. One of the spacers disclosed by Kaden includes a completely circular opening surrounding one of the extensible members. The other spacer has a partial circular opening and a boss which fits in one of two holes in the other extensible member, so that the spacer is moveable only between two positions on the spacer. Thus, it may be difficult to locate the spacer when there are pre-existing obstructions or holes in the ceiling between the joists.

SUMMARY OF THE INVENTION

This invention is directed toward an improved interjoist hanger support incorporating features overcoming the disadvantages of the prior art as discussed above. These improvements include an extensible hanger support which maintains the desirable features of a threaded interconnection between extensible members which are telescopically movable along an axis between fully collapsed and fully extended conditions, while at the same time permitting rapid power-assisted movement therebetween for quickly extending the members from a fully collapsed condition to a fully extended condition. Another feature incorporated herein provides pair of axially movable spacers for spacing a hanger support by a fixed amount from the upper surface of the ceiling while at the same time providing axially adjustable movement of the spacers so as to distribute the loading to minimize sagging, particularly when the spacer bar is in its essentially fully extended condition. Another feature of the invention herein is the employment of electrical box mounting screws which extend downwardly from side flanges of the saddle brackets mounted on a spacer bar with the mounting screws being provided with resilient washers to prevent the screws from being dislodged during single-handed installation of an electrical outlet box to the saddle flanges with nuts threaded onto the screws.

In accordance with one aspect of the present invention, an extensible hanger support is provided for use in providing a spanning connection between two spaced-apart ceiling joists or the like for supporting therefrom such items as ceiling fans, light fixtures and the like. The support includes first and second extensible members which are telescopically movable between a fully collapsed condition and a fully extended condition. These extensible members employ cooperative means which are normally in threaded engagement such that rotation of one of the members relative to the other results in axial movement toward either the fully collapsed condition or the fully extended condition, depending upon the direction of rotation. Each extensible member has a free end which carries joist-engaging means for engaging a ceiling joist. The invention further provides power-engaging means for quickly separating and fully extending the extensible members while permitting axis movement in the opposite direction in response to rotational movement in a direction causing the members to be displaced to the collapsed condition.

In accordance with another aspect of the present invention, an extensible interjoist hanger support is provided for spanning between a pair of spaced apart joists and the like having opposing surfaces. The support includes first and second extensible members which are telescopically movable in opposing axial directions between a fully collapsed length and a fully extended length. Each of the extensible members has a free end carrying joist-engaging means for engaging one of the opposing surfaces of a pair of joists. Additionally, each member carries a spacer such that, in assembly with the joist-engaging means in engagement with opposing surfaces of a pair of ceiling joists, the hanger support is spaced vertically above the ceiling. The spacers are axially movable so that loading on said hanger support may be adjustably distributed to various points on the ceiling.

In accordance with a still further aspect of the present invention, an extensible interjoist hanger support is provided for spanning between a pair of spaced apart ceiling joists having opposing surfaces. A pair of extensible members are telescopically movable in opposing axial direction between a collapsed length and a fully extended length. Each of these extensible members has a free end carrying a joist-engaging means for engaging one of the opposing surfaces of a pair of joists. A mounting saddle bracket having a pair of oppositely directed mounting flanges to which an electrical outlet box may be secured is also provided. The flanges have apertures for carrying a pair of screws which extend downwardly through the respective apertures. The outlet box is then positioned so that the screws extend through a pair of cooperating holes in the outlet box and are then held in place with a pair of lock nuts threaded onto the threaded ends of the screws. Each of the screws is located so that it extends downwardly through an aperture in a saddle flange with the screw being prevented from dislodgement by a washer carried by the screw on the lower side of the flange. This serves to prevent the screw from becoming dislodged from the flange while the nut is being threaded onto the screw to secure the outlet box to the saddle bracket.

BRIEF DESCRIPTION OF THE DRAWINGS

The invention is better understood by reading the following Detailed Description of the Preferred Embodiments with reference to the accompanying drawing figures, in which like reference numerals refer to like elements throughout, and in which:

FIG. 3 is a view taken along line 3—3 looking in the direction of the arrows in FIG. 2;

FIG. 4 is a view taken along line 4—4 looking in the direction of the arrows in FIG. 2;

FIG. 5 is a view taken along line 5—5 looking in the direction of the arrows in FIG. 2;

FIG. 6 is an enlarged end view illustrating the hanger support of FIG. 1, having an electrical outlet box mounted thereto by means of a snap saddle and fastening means.

FIG. 7 is an elevational view partly in section showing the manner of installing the hanger support to a pair of spaced ceiling joists; and FIG. 8 is a view similar to that of FIG. 7, but showing the hanger support in place with both of its free ends having joist-engaging means in engagement with the opposing surfaces of a pair of ceiling joists.

DETAILED DESCRIPTION OF THE PREFERRED EMBODIMENTS

Figure 1:
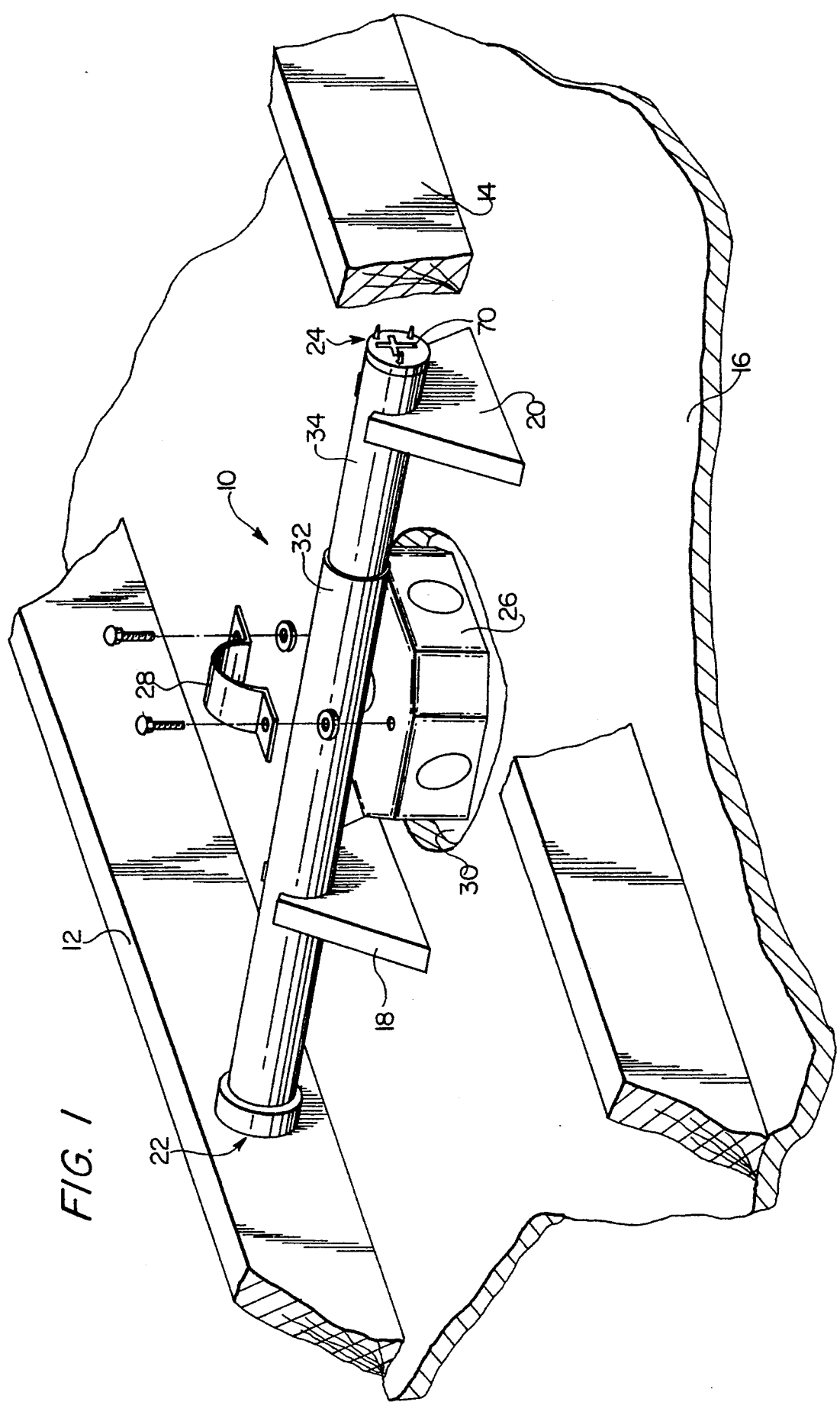
FIG. 1 is a perspective view of one embodiment of the hanger support in accordance with the present invention.

In describing preferred embodiments of the present invention illustrated in the drawings, specific terminology is employed for the sake of clarity. However, the invention is not intended to be limited to the specific terminology so selected, and it is to be understood that each specific element includes all technical equivalents which operate in a similar manner to accomplish a similar purpose.

Figure 2:
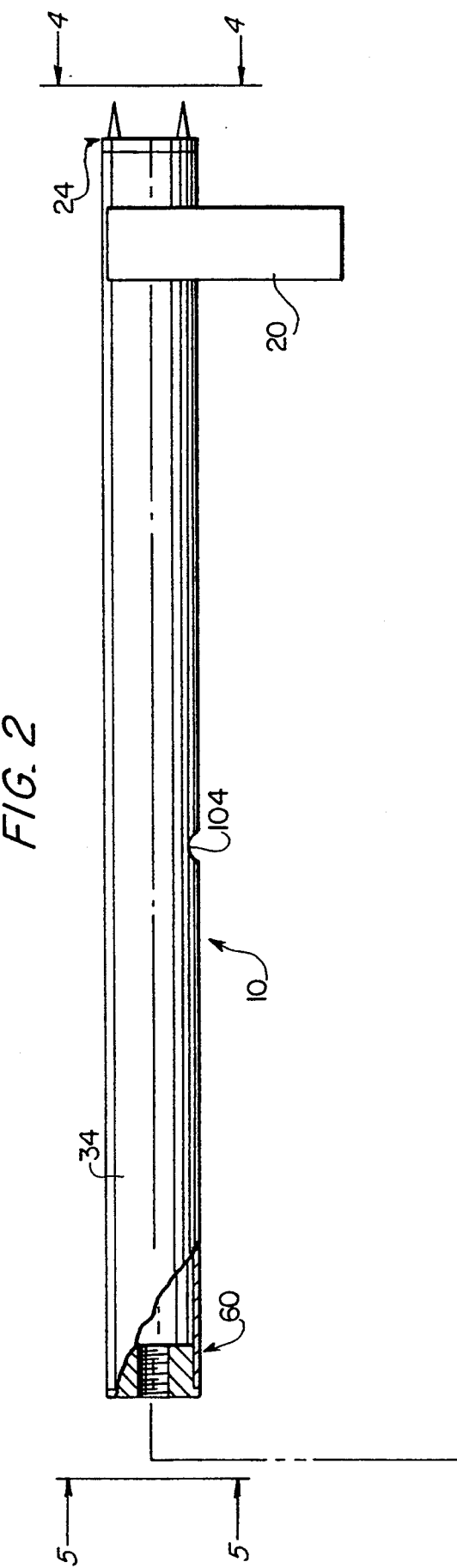
FIG. 2 is an enlarged elevational view of the hanger support of FIG. 1 with parts of the hanger spacer broken away.
Figure 2:
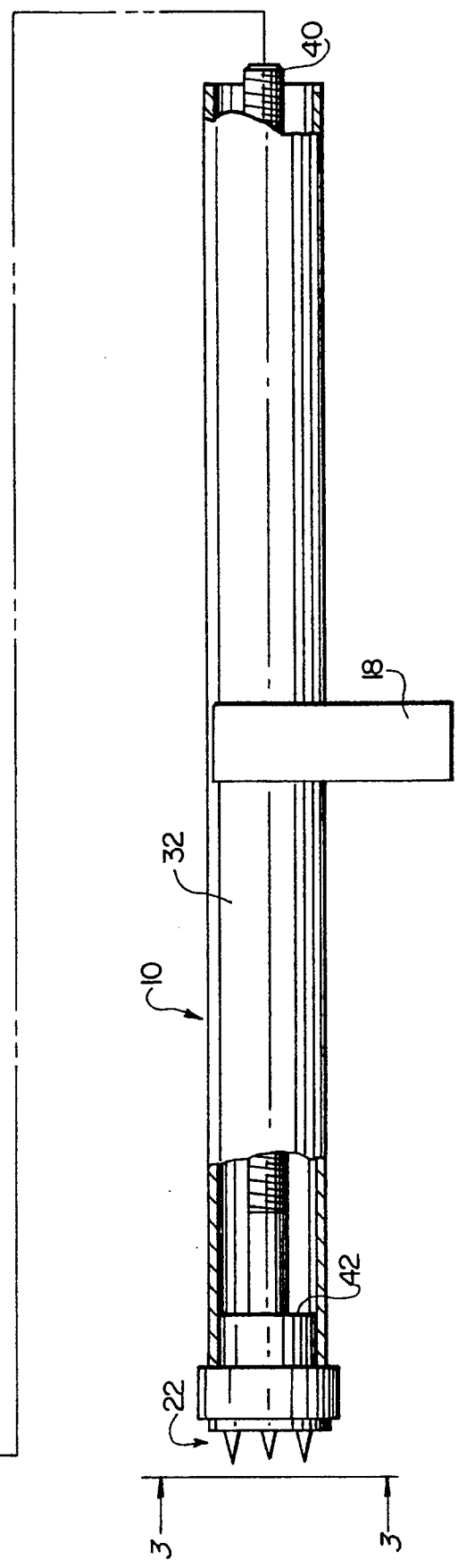

One application of the present invention is illustrated in FIGS. 1 and 2 wherein a hanger support 10 constructed in accordance with the invention extends between a pair of ceiling joists 12 and 14 in an interfloor location above a ceiling 16. The hanger support 10 extends transversely between joists 12 and 14 and is spaced above the ceiling 16 so as to be essentially parallel therewith by means of a pair of spacers 18 and 20. The extended or free ends of the hanger support 10 carry joist-engaging prongs 22 and 24 which respectively engage the facing surfaces of ceiling joists 12 and 14. An electrical outlet box 26 is suspended from the hanger support 10 and secured thereto by means of a saddle bracket 28 and appropriate fastening means to be discussed in greater detail hereinafter. The electrical outlet box 26 extends through an opening 30 in the ceiling 16. As is conventional, the outlet box 26 mounts a relatively heavy fixture such as a light fixture or a ceiling fan which then hangs from the hanger support 10.

Hanger support 10 is preferably constructed of metal exhibiting sufficient strength and rigidity to support a fixture such as a ceiling fan, which may weigh on the order of 10 to 65 pounds. In its fully collapsed condition the hanger support has a length on the order of 14 inches, whereas in its fully extended condition, as shown in FIG. 8, it has a length on the order of 23 inches. Although the hanger support is preferably constructed of metal, spacers 18 and 20 may be constructed of light weight material, such as plastic.

Hanger support 10 includes a pair of telescopically extensible tubular portions 32 and 34 with tubular portion 32 coaxially surrounding a portion of the length of portion 34 and being of dimensions to permit axial slidable movement of one relative to the other.

Tubular portions 32 and 34 are interconnected by means of a threaded rod and nut arrangement which cooperate to normally provide a threaded engagement with one another such that rotation of either tubular portion 32 or 34 results in axial movement of the tubular portions between their fully collapsed length to a fully extended length, as in FIG. 8.

Tubular portion 32 carries and coaxially surrounds a threaded rod 40 which is coextensive with the length of tubular portion 32. Rod 40 has a cap 42 secured thereto at one end, as with a pin extending therethrough. The cap 42 has a cylindrical outer surface which is press fit to the inner circumferential surface of one end of the tubular portion 32. The end of cap 42 carries a prong assembly 22 so that the prong assembly is held in place against axial movement but is free to rotate about the axis of rotation of the tubular portion 32. The prong assembly 22 includes spaced apart prongs which serve to engage and then dig into a ceiling joist, such as joist 12, when forces, such as jack screw forces, are applied as rod 40 is turned in a direction causing the hanger support to be driven toward its fully extended condition. It is during this operation that the tubular portion 32 may rotate relative to the prong assembly 22.

The threading provided on threaded rod 40 extends from the distal end of the rod toward cap 42 for most of the length of the rod. The other tubular portion 34 carries a threaded nut assembly 60 at its inner end which, as will be described in greater detail hereinafter, is normally in threaded engagement with the threaded rod 40 so that rotation of either tubular portion 32 or 34 will cause the tubular portions to move inwardly toward their fully collapsed length, or outwardly toward their fully extended length.

The outer free end of the tubular portion 34 carries a prong assembly 24 for engagement with a ceiling joist, such as joist 14 (FIGS. 1, 7, and 8). This prong assembly is fixed, as by welding, to tubular portion 34, unlike the loose rotational relationship of prong assembly 22 to tubular portion 32. Prong assembly 24 includes a plurality of prongs which are adapted to engage and then dig into a ceiling joist, such as joist 14, particularly when jack screw forces are applied as tubular portions 32 and 34 are rotated relative to each other in a direction causing axial movement of the members toward their fully extended length.

As shown in FIGS. 1, 4, and 6, prong assembly 24 is provided with a central crisscross-shaped aperture 70. This power-engaging means permits use of a tool, such as a power screwdriver or a power drill, to make a driving connection with tubular portion 34 by way of the crisscross-shaped aperture 70 so as to rapidly rotate tubular portion 34 relative to tubular portion 32 to achieve relative axial movement therebetween, such as when collapsing the hanger during packaging of the product or expanding it prior to installation in the ceiling.

This feature permits an installer to more rapidly install the hanger support in place between a pair of ceiling joists. It is contemplated that manufacturers of telescopically extensible hanger supports provide such supports in a collapsed condition because of packaging requirements. Assuming the total length of a hanger support is about 13 to 14 inches, this may require only a minimal number of turns to extend the hanger support a sufficient length to be used between ceiling joists that are spaced about 16 inches apart. However, if the ceiling joists are spaced apart by a greater distance, such as about 24 inches, then a substantial amount of additional time is required to manually rotate the members through their threaded engagement to extend the hanger support to essentially its fully extended length prior to installation. To alleviate this, the present invention provides crisscross-shaped power-engaging means for quickly separating the telescopic extensible members from each other. The multi-purpose crisscross-shaped aperture 70 in the joist-engaging end of the inner tube 34 enables the installer to utilize a variety of bits common to today's battery-operated power tools, prevalent in the fan and light installation industry, such as square, diamond, Phillips, flat, and hex-shaped tools. The crisscross shape of aperture 70 can accommodate a small flat-blade screwdriver bit, securing it from one corner to the other; a Phillips-head bit (essentially a square shape when all four flanges are connected in plane); or even a hex bit would catch the aperture's sides to rotate the tubes. Aperture 70 allows the installer to reduce lengthy hanger expansion time from minutes down to seconds prior to installing the hanger in the ceiling, thereby speeding up hanger installation time.

It is contemplated that during installation, particularly in existing homes, ceiling 16 will be provided with an opening 30, such as a four inch round hole, through which the hanger support will be inserted for mounting between a pair of ceiling joists, such as joists 12 and 14. Spacers 18 and 20 may be mounted on the hanger support prior to inserting the support through the opening 30 to the space above ceiling 16. As best shown in FIGS. 3 and 4, each of the spacers is somewhat triangular in shape and each has a partial circular opening 90 and 94, respectively, near one apex for receiving a portion of the length of the hanger support 10. The partial circular openings 90, 94 do not surround tubular portions 32, 34, but permit the tubular portions to be snapped into place by way of an upper opening 96 (see FIGS. 4 and 5). The fit is such that tubular portion 32 may be rotated within opening 90 while the relatively flat lower surface 92 of the spacers sit flat against the upper surface of ceiling 16. This will allow tubular portion 32 as well as threaded rod 40 to be rotated. Also, portion 32 may slide axially through opening 90.

Opening 94 of spacer 20 is also provided with an upstanding boss 98 (shown by dotted lines in FIG. 4) which, in assembly, is received within a hole 100 in tubular portion 34. This prevents tubular portion 34 from rotating about its axis when spacer 20 is mounted with its lower surface 102 flush against the upper surface of ceiling 16. This rotation prevention could also be accomplished by curved indentations on opposing sides of the walls of tubular portion 34 for a similarly shaped spacer to slide up into, thereby stopping tubular rotation.

In an alternate embodiment, opening 94 of spacer 20 does not include an upstanding boss, so that spacer 20 is moveable to any position on tubular portion 34, thereby allowing more flexible adjustment of weight distribution on the hanger. In this embodiment, both tubular portions 32, 34 may be rotated within openings 90, 94 and slid axially through openings 90, 94. This is an improvement over U.S. Pat. No. 5,150,868 to Kaden, which discloses a spacer axially moveable only between two positions on an extensible member.

When the hanger support is placed above ceiling 16 and spacers 18 and 20 are mounted to the support, the joist-engaging prong assembly 24 may be pressed against ceiling joist 14. Thereafter, with one hand an installer may rotate the tubular member 32 and the threaded rod 40 in a direction causing the support to extend toward its fully extended length. As the hanger support is being extended, the rotatable joist-engaging means 22 will engage the ceiling joist 12 and the prongs of prong assembly 22 will penetrate the wood as additional jack screw forces are applied by the installer continuing to rotate tubular portion 32. A pre-determined number of turns allows the joist-engaging prong assemblies 22 and 24 to make full engagement with the ceiling joists 12 and 14 and prevents the joists from being spread apart by excessive rotations. During rotation of tubular portion 32, tubular portion 34 is prevented from rotating by boss 98 on spacer 20 extending through a hole 100 in tubular portion 34. It may be desirable to adjust the axial location of spacers 18 and 20, particularly where joists 12 and 14 are spaced by 24 inches as opposed to a normal 16 inches. In such case, it may be desirable to displace spacer 18 from a location close to the free end of tubular portion 32 to a location closer to the hole 30 in the ceiling 16, such as the position shown by the dotted line of spacer 18 in FIG. 8. Correspondingly, it may be desirable to axially displace spacer 20 from the location as shown by the solid figures in FIG. 8. to that as shown by the dotted line in FIG. 8. Tubular portion 34 is provided with a second hole 104 for receiving boss 98 on spacer 20. Consequently, spacer 20 may be disengaged from tubular portion 34 at the location shown by the solid lines in FIG. 4 and positioned to the location shown by the dotted lines in FIG. 8 with boss 98 extending into hole 104 instead of hole 100 to thereby hold the hanger support 34 in place and to prevent it from rotating about its axis. Such movement of spacers 18 and 20 permits the installer to distribute the loading as desired.

In an alternate embodiment, tubular portion 34 does not include a boss, and both tubular portions 32, 34 are rotatable. This allows axial adjustment of both spacers 18, 20 to an infinite number of positions on tubular portions 32, 34, thereby providing greater flexibility in distributing the load on the hanger support.

When the hanger support is in place between the ceiling joists 12 and 14 as shown in FIGS. 1 and 8, the installer will mount electrical outlet box 26 to suspend it from hanger support 10 with the assistance of a saddle bracket 28. As best seen in FIGS. 1 and 6, saddle bracket 28 includes a central inverted u-shaped portion 110 and outwardly extending side flanges 112 and 114. The central portion 110 is adapted to snap onto a portion of the length of tubular portion 32 with a snap fit. The electrical outlet box 26 is secured to the flanges 112 and 114 by fastener assemblies 120 and 122 to be described in detail below. A lighting fixture or ceiling fan or the like is then connected to the electrical outlet box 26 and thereby suspended from the hanger support 10.

Each of the fastener assemblies 120 and 122 includes a screw having a rounded head or cap 130 mounted at one end of a square shank 132. Extending away from the square shank 132 there is provided a threaded portion 134. Each of the flanges is provided with a square aperture 136 which is fitted to receive the square shank 132 in such a manner as to prevent rotational movement of the screw about its axis of rotation. This will hold the screw in place during fastening, provided that the screw does not dislodge vertically from square aperture 136. As shown in FIG. 6, a washer 140 is carried on the threaded portion 134 of the screw just below the square shank 132. This washer is located between flange 114 and the upper wall of the outlet box 26. Consequently, when the installer is attaching a nut 142 to the free end of the screw below the electric outlet box 26, there may be a tendency to dislodge the screw in an upward direction so that the square shank 132 is dislodged from the square hole 136. If this were to occur, the operator would not be able to install nut 142 onto the screw to tighten the connection between outlet box 26 and flange 112. The washer 140 prevents the screw from being dislodged in an upward direction sufficient for the square shank 132 to be dislodged from the square hole 136. Consequently, the operator using but one hand is able to install nut 142 onto the screw with the screw being prevented from being dislodged from the aperture 136 during installation, thereby saving considerable installation time.

Modifications and variations of the above-described embodiments of the present invention are possible, as appreciated by those skilled in the art in light of the above teachings. It is therefore to be understood that, within the scope of the appended claims and their equivalents, the invention may be practiced otherwise than as specifically described.

What is claimed is:

1. An extensible interjoist hanger support for spanning between a pair of spaced-apart, joists having opposed surfaces, said hanger support comprising:
first and second telescopically extensible members moveable in opposing axial directions between a fully collapsed length and a fully extended length, each member having a free end carrying joist-engaging means for engaging said opposing surfaces of said joists;
cooperative means attached to said first and second extensible members, said cooperative means being normally in threaded engagement such that rotation of either extensible member relative to the other results in axial movement between said fully collapsed length and said fully extended length;

an aperture located on the free end of said second telescopically extensible member for achieving relative axial movement between said first and second extensible members in response to power-assisted rotational forces applied to said second extensible member through said aperture to rotate said second extensible member relative to said first extensible member; and first and second spacers carried by said first and second extensible members, respectively, with said first spacer being slidably moveable to any position on said first extensible member and said second spacer being slidably moveable to any position on said second extensible member.

2. The extensible interjoist hanger support of claim 1, wherein said cooperative means comprise:

an elongated rod secured to said first extensible member and having threading thereon for a substantial portion of its length; and a nut carried by said second extensible member and normally in threaded engagement with said threaded rod so that rotational movement of either of said extensible members relative to each other results in axial movement between said fully collapsed length and said fully extended length.

3. The extensible interjoist hanger support of claim 1, further comprising:

a saddle bracket carried by said hanger support, said saddle bracket having a pair of outwardly extending flanges to which an electrical outlet box may be secured; and fastening means for securing said outlet box to said flanges.

4. An extensible interjoist hanger support as in claim 3, wherein said fastening means comprise:

a pair of nut and bolt assemblies, each nut and bolt assembly having a screw extending downwardly through an aperture in one of said flanges and having a threaded portion for threadably receiving a nut to secure said outlet box to said flange;

a washer carried by said threaded portion of said screw for preventing said screw from being dislodged in a vertical direction while said nut is being threaded onto said screw.

5. An extensible interjoist hanger support for spanning between a pair of spaced-apart, joists having opposed surfaces, said hanger support comprising:

first and second telescopically extensible members moveable in opposing axial directions between a fully collapsed length and a fully extended length, each member having a free end carrying joist-engaging means for engaging said opposing surfaces of said joists;

cooperative means attached to said first and second extensible members, said cooperative means being normally in threaded engagement such that rotation of either extensible member relative to the other results in axial movement between said fully collapsed length and said fully extended length;

an aperture located on the free end of said second telescopically extensible member for achieving relative axial movement between said first and second extensible members in response to power-assisted rotational forces applied to said second extensible member through said aperture to rotate said second extensible member relative to said first extensible member;

first and second spacers carried by said first and second extensible members, respectively, with said first spacer being slidably moveable to any position on said first extensible member and said second spacer being slidably moveable to any position on said second extensible member;

a saddle bracket carried by said hanger support, said saddle bracket having a pair of outwardly extending flanges to which an electrical outlet box may be secured; and fastening means for securing said outlet box to said flanges.

6. A method of installing an interjoist hanger support between a pair of first and second ceiling joists comprising the steps of:

extending a pair of first and second telescopically extensible members moveable in opposing axial directions between a fully collapsed length and a fully extended length with each member having a free end carrying joist-engaging means, by applying power-assisted rotational forces to an aperture located on the free end of said second telescopically extensible member;

attaching first and second spacers to said first and second extensible members, respectively;

engaging said joist-engaging means of said second extensible member with said second joist;

rotating said first extensible member relative to said second extensible member until said joist-engaging means of said first extensible member engage said first joist; and adjusting the position of said first and second spacers on said first and second extensible members, respectively, by sliding said first and second spacers axially along said first and second extensible members.

* * * * *